US007062858B2

(12) United States Patent  
Hirsch

(10) Patent No.: US 7,062,858 B2  
(45) Date of Patent: Jun. 20, 2006

(54) HAND TOOL AND KNIFE FOR DEBURRING

(75) Inventor: Shalom Hirsch, Shavei Zion (IL)

(73) Assignee: Noga Engineering, Ltd., Shlomi (IL)

( * ) Notice: Subject to any disclaimer, the term of this patent is extended or adjusted under 35 U.S.C. 154(b) by 53 days.

(21) Appl. No.: 10/392,707

(22) Filed: Mar. 19, 2003

(65) Prior Publication Data

US 2003/0177643 A1  Sep. 25, 2003

(30) Foreign Application Priority Data

Mar. 22, 2002 (DE) ................... 102 13 024

(51) Int. Cl.
  *B26B 3/00* (2006.01)
  *B26B 1/00* (2006.01)
(52) U.S. Cl. ................... 30/169; 30/257; 408/75; 408/239 R
(58) Field of Classification Search .............. 30/169, 30/317, 321, 331, 103, 172, 314, 315, 340, 30/342, 338, 164.95, 257, 657, 527; 279/30, 279/24, 103; 408/238, 239 R, 240, 279, 408/75, 78; 81/177.85, 438

See application file for complete search history.

(56) References Cited

U.S. PATENT DOCUMENTS

| 1,814,655 | A | * | 7/1931 | Andreasson | 279/76 |
|---|---|---|---|---|---|
| 2,478,026 | A | * | 8/1949 | Thorell | 30/172 |
| 2,759,263 | A | * | 8/1956 | Shigley et al. | 30/317 |
| 2,803,877 | A | * | 8/1957 | Belanger | 30/317 |
| 2,860,858 | A | * | 11/1958 | Kurs | 366/129 |
| 2,893,765 | A | * | 7/1959 | Lyon | 403/107 |
| 2,913,935 | A | * | 11/1959 | Flannery et al. | 408/198 |
| 3,292,238 | A | * | 12/1966 | De Vlieg et al. | 407/86 |
| 3,787,972 | A | * | 1/1974 | Carossino | 30/317 |
| 3,886,656 | A | * | 6/1975 | Meshulam et al. | 30/164.9 |
| 4,320,998 | A | * | 3/1982 | Kubicek | 408/226 |
| 4,338,718 | A | * | 7/1982 | Olkkola | 30/171 |
| 4,344,230 | A | * | 8/1982 | Olander | 30/277.4 |
| 4,442,601 | A | * | 4/1984 | Hirsch et al. | 30/169 |
| 4,512,693 | A | * | 4/1985 | Swanson | 408/239 R |
| 4,619,564 | A | * | 10/1986 | Jacobson | 408/146 |
| 4,777,725 | A | * | 10/1988 | Hirsch | 30/331 |
| 4,900,202 | A | * | 2/1990 | Wienhold | 408/240 |
| 4,991,306 | A | * | 2/1991 | Raiha | 33/520 |
| 5,033,920 | A | * | 7/1991 | Cantanese | 408/239 R |
| 5,271,135 | A | * | 12/1993 | Shifferly | 407/29.15 |
| 5,314,032 | A | * | 5/1994 | Pringle et al. | 175/74 |
| 5,379,542 | A | * | 1/1995 | Guzman | 42/95 |
| 5,438,757 | A | * | 8/1995 | Weschenfelder | 30/139 |
| 5,573,255 | A | * | 11/1996 | Salpaka | 279/75 |
| 6,082,008 | A | * | 7/2000 | Lariviere, Jr. | 30/294 |
| 6,315,060 | B1 | * | 11/2001 | Schuda et al. | 173/132 |
| 6,450,269 | B1 | * | 9/2002 | Wentworth et al. | 175/61 |
| 6,612,586 | B1 | * | 9/2003 | Liou | 279/22 |

FOREIGN PATENT DOCUMENTS

FR  2 759 930 A1  8/1998

\* cited by examiner

*Primary Examiner*—Allan N. Shoap  
*Assistant Examiner*—Ghassem Alie  
(74) *Attorney, Agent, or Firm*—Victor N. King; Speckman Law Group PLLC

(57) ABSTRACT

A hand tool for deburring is provided, as well as a cutting blade to be inserted into the tool, the tool comprising a housing, and a rotatable holding device, the holding device being positioned in and being rotatable in the housing and having a chamber for releasably holding a cutting blade, the chamber running obliquely to the axis of rotation (z) of the holding device.

8 Claims, 4 Drawing Sheets

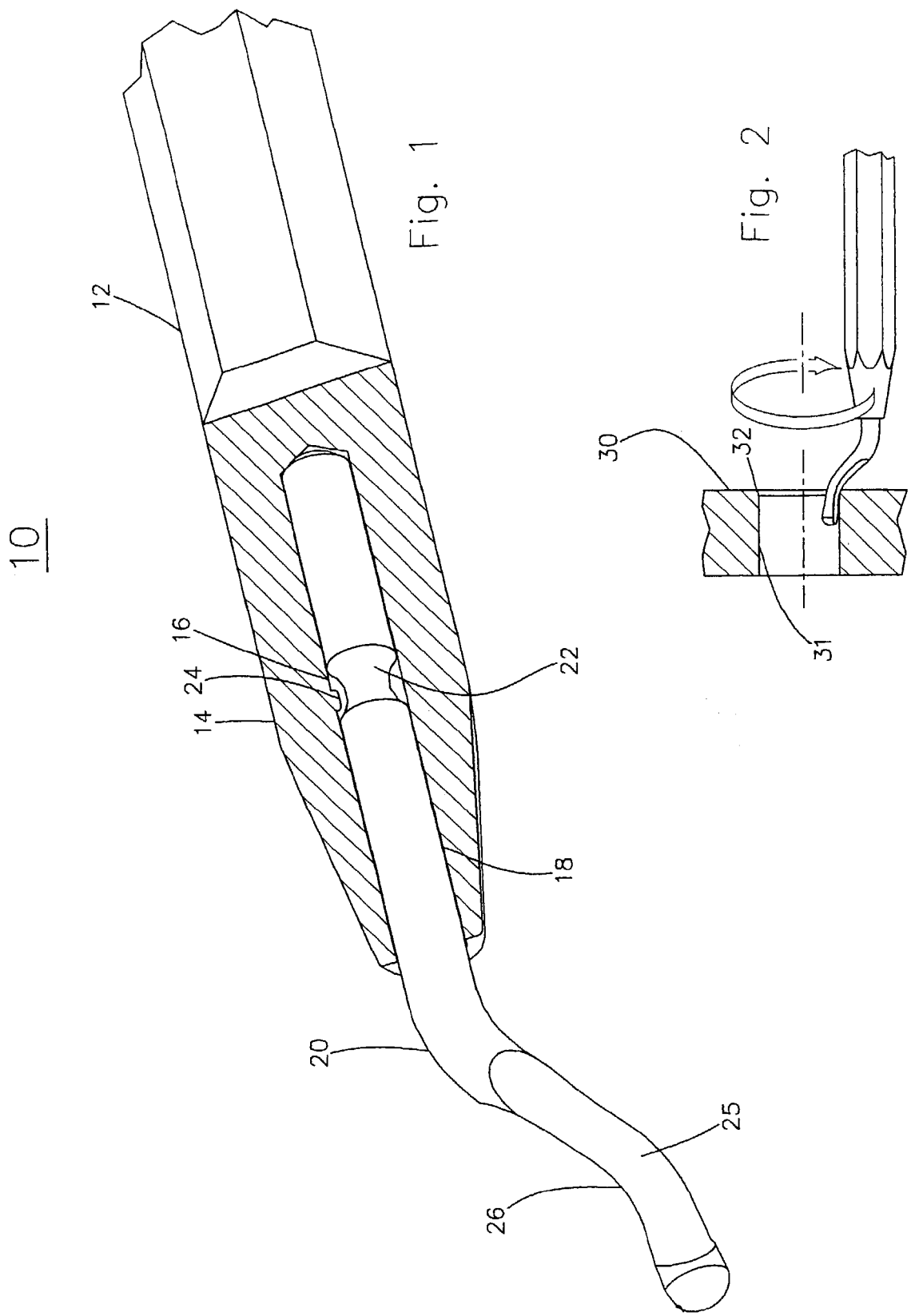

HAND TOOL AND KNIFE FOR DEBURRING

TECHNICAL FIELD OF THE INVENTION

This invention relates to a manual deburring tool, and a blade which can be inserted into it.

BACKGROUND OF THE INVENTION

Hand tools for deburring sharp corners, using rotating blades, are known in the art. Such hand tools consist of a handle and a cutting blade, which is made of round wire that has been bent into the form of a crank. The blade rotates in a longitudinal hole of the handle, and the cutting edge of said blade follows along the edge of a hole or straight line of a part to be deburred. Such hand tools are used mostly in the metalworking and plastics industries.

FIG. 1 shows a known deburring tool 10. It consists of a handle 12 and a housing 14. Housing 14 may be made in a single piece with handle 12. Alternatively, handle 12 could be made as a separate part, which can be fastened removably to the housing. A blind hole 16 is drilled into the housing 14, into which the round shaft 18 of a cutting blade 20 is inserted. This round shaft 18 has a groove 22, into which a protrusion 24 enters, this protrusion being part of housing 14. Protrusion 24 prevents axial movement of the cutting blade 20, while still allowing free rotation of it in the housing. The cutting blade 20 has a cutting head 25 with a cutting edge 26. This cutting head 25 is bent, so the cutting edge 26 runs along a line, which lies outside the axis of rotation of shaft 18.

FIG. 2 shows an example of deburring the sharp edge of a hole 31 that was drilled into a workpiece 30. The blade 20 with its cutting edge 26 is inserted into hole 31 and, while being held by handle 12, a circular motion is performed, while exerting light pressure towards the workpiece. The blade 20 acts like a crank, so that its cutting edge 26 slides along the edge 32 of hole 31, and thereby removes the burrs that were created during the drilling operation. During this operation, the cutting edge 26 will automatically adjust itself to the correct cutting angle.

A similar hand tool is described in German patent application no. DE OS 2 129 768. This tool also includes a blade with a round shank which acts as a shaft, rotating in a tool holder which acts as a bearing. This tool holder is held in the handle. A disadvantage of these known deburring tools is the fact that their blades are difficult to manufacture. In addition, sometimes it is necessary to lock the rotatability of the blade. It would be difficult to apply a mechanism for blocking this rotation directly to the small round shaft of the blade, and such a mechanism would make a smooth rotation problematic.

Another hand tool for deburring holes and edges is described in French patent No. 2759930. This hand tool consists of a handle and a holding unit. There the holding unit is made of a shaft, which at its outer end is formed into a blade-holder. As shown there in FIG. 1 of French patent 2759930, the shaft 28 and the blade-holder 21 take the form of a crank. The shaft 28 rotates in bearing 25, and at its end 32 a counterweight 31 is fastened. The purpose of this counterweight is to ensure that whenever a user takes the tool into his hands, the holding unit will point upwards. The blade-holder has a longitudinal hole into which a cutting blade can be inserted. It also has a threaded cross-hole through which the cutting blade can be fastened.

SUMMARY OF THE INVENTION

The present invention provides a hand tool that solves the above-mentioned problems, especially wear and tear of the shaft, thereby facilitating smooth rotation.

One of the basic ideas underlying this invention, is the introduction of a rotational mechanism, by which the cutting tool itself does not rotate in the housing, but is releasably held in a holding unit, which in turn rotates freely in a housing. The cutting blade is held in such a position, so that deburring can be performed successfully.

The present invention thus provides a hand tool for deburring which comprises a housing and a cutting tool, or blade, which freely rotates relative to this housing. A rotatable holding device is located inside this housing, for directly or indirectly retaining the cutting blade.

As the holding device is made to be the rotating member, instead of the shaft of the cutting blade itself, inaccuracies of the blade-shaft which would hinder smooth rotation, are now eliminated. The larger diameter of the holding device as compared to the cutting blade assures more even rotation, resulting in a better finish achieved, and longer life of the cutting blade. As mentioned above, known rotary blade deburring tools have their cutting edge located outside the axis of the blade's rotation. This feature enables the cutting edge to set itself at the correct cutting angle. In order to utilize this advantage also in the present invention, the interior of the holding device has a sloped chamber made to take the basically straight cutting blade. The centerline of this chamber forms an angle to the axis of rotation.

The cutting tool can be made in the form of a cutting blade, or with an indexable insert. In the case of the indexable insert, the cutting edge runs preferably along a straight line, not curved.

In order to simplify production of this hand-tool, and to reduce manufacturing costs, the housing and the handle are preferably made in one piece. Alternatively, the handle and the housing may be made in two pieces, and the housing would then be removably fastened to the handle.

In order to prevent axial movement of the holding device, it has a step at the end of its shaft, which fits into an appropriate hole in the handle, forming a thrust bearing.

For certain applications it may be necessary to have a tool with a non-rotating cutting blade. For this purpose, a locking device is provided, which blocks the rotation of the holding device in the housing. In a preferred design, this locking mechanism comprises a sleeve that is inserted between the housing and the holding device, plus a ball that can slide in a slot that has been cut into the holding device. Said sleeve has at least one internal recess into which the ball can slide. In the blocked position, the cutting blade holds said ball in the recess of the sleeve. Instead of one recess, the ring may have many such recesses, spaced along an internal step. This sleeve, which is referred to as a "locking ring", makes it possible to block the rotation of the holding device in any rotational position. Said sleeve is pressed firmly into the housing and cannot rotate in it. Additional dowel pins may be provided, to assure that the rotating holding device would not be able to drive the sleeve with it.

The rotating holding device and its sloped chamber for accepting the cutting blade, allow the cutting blade to be made essentially straight, while still facilitating the self-adjusting feature as with the known blades, formed by bending, thereby offering ease of manufacture of the cutting blade.

As the cutting blade itself does not rotate, but is held in the rotating holding device, it can have, at least partially, a polygonal cross section. Such blades, without bends, are easier and more cost-effective to make than known blades having a bent head and a round shank. In addition, the chamber of the holding device has, at least near its opening, the form of a polygon, mating the form of the blade-shank.

In order to fasten the cutting blade releasably to the housing, a small notch is ground into it near the end of its shaft, and this notch snaps into a corresponding catch in the chamber when the blade is inserted into the chamber. Furthermore, inside the chamber is a spring, preferably a leaf spring, which presses the blade against said catch. To remove the blade from the chamber, the outer end of the blade is pressed against the spring pressure, until its notch is released from the catch.

As the section of the blade is essentially rectangular, it is possible to grind a locking notch also into the opposite side of the blade. This enables the user to turn the blade over, after one cutting edge is blunt.

The cutting blade usually has at its cutting end a small groove ground into it, in order to guide the blade, and avoid slipping.

In an alternative embodiment of deburring tool of the present invention, the cutting blade is not held directly in the chamber, but in a toolholder, the shaft of which is made to fit into the chamber, and the other end of which is formed into an elbow which runs at a predetermined angle to the shaft. At the outer end, this elbow is split into two parts, and between them a cutting tool can be fastened at a predetermined angle. The shaft of said toolholder has a polygonal section, and has at least one locking notch. Accordingly, a cutting blade is provided, which has a shaft and is essentially straight. At least the shaft of the cutting blade has a polygonal section. This cutting blade can be inserted into a rotatable toolholder.

BRIEF DESCRIPTION OF THE DRAWINGS

Two embodiments of the hand tool of the present invention will be explained in detail with the aid of the drawings, in which:

FIG. 1 illustrates a known deburring tool, shown partly in sectional view;

FIG. 2 illustrates the use of the known deburring tool of FIG. 1 to deburr a hole;

DETAILED DESCRIPTION OF THE INVENTION

Figure 3:
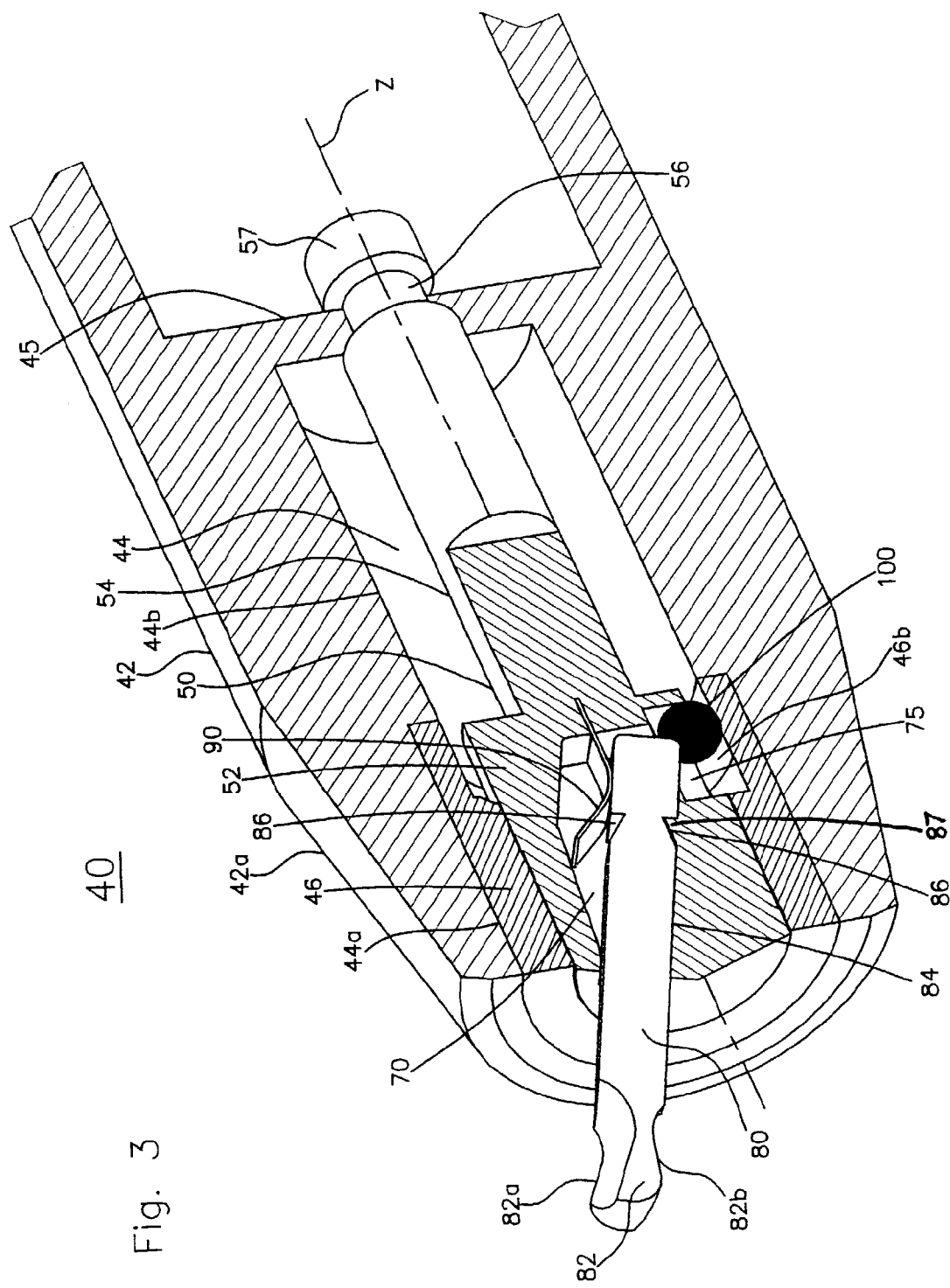
FIG. 3 illustrates a sectional view of the front part of a deburring tool according to the present invention.

FIG. 3 shows, in a partially sectional view, the front part of a deburring tool 40 of the present invention. FIG. 3 shows housing 42 of deburring tool 40, said housing 42 may become part of the handle. This housing 42 has a circular section and tapers at its end 42a. Inside housing 42 is a bore, preferably a blind bore 44, which may reach into the handle of deburring tool 40. Longitudinally, bore 44 has a stepped section. As shown in FIG. 3, the front part 44a of bore 44, may be located at the front end 42a of housing 42, whereas a second part, 44b, of bore 44, may extend into the handle. The inside diameter of the front part of the bore, 44a, is larger than the inside diameter of the rear part 44b, of bore 44.

Figure 6:
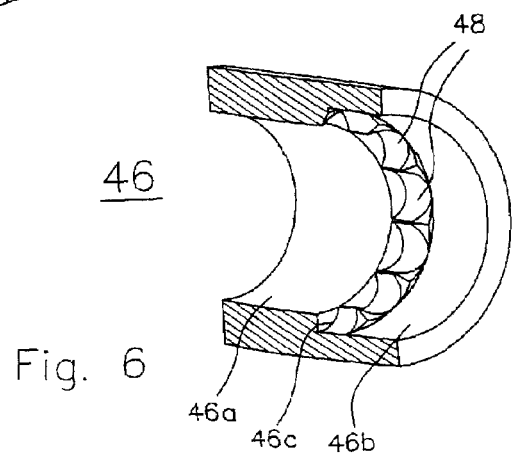
FIG. 6 illustrates the "locking ring" of the deburring tool of FIGS. 3–5.

A cylindrical sleeve 46 is pressed into the front part 44a of bore 44. Sleeve 46 is shown in FIG. 6. This sleeve has at its front end a plain cylindrical bore 46a, and at its rear end a larger bore 46b. In the area of the step thus formed, are many recesses 48, each having a half-round section, which are equally spaced around the bore. Recesses 48 form a so-called "locking ring". The depth of each of these recesses is such that it leads into bore 46a without a step. The function of this locking ring will be explained later.

Figure 5:
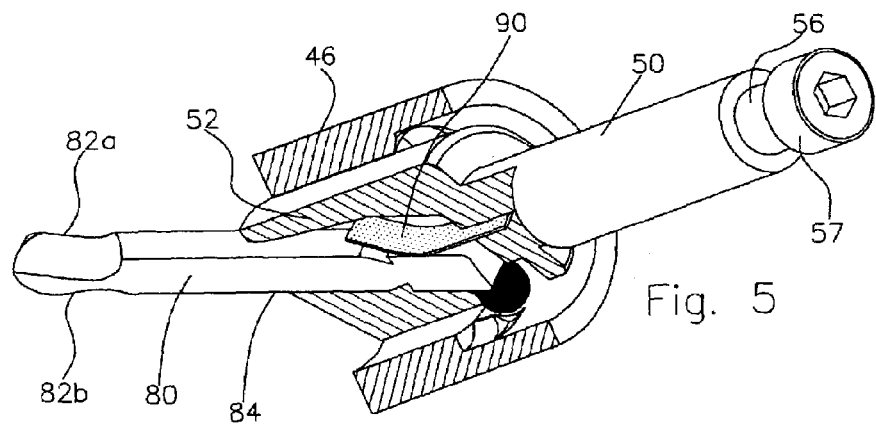
FIG. 5 illustrates the holding device with cutting blade according to FIG. 3, in which the holding device is prevented from rotating by the locking mechanism.

Into the bore 44 of housing 42 a round holding device 50 is inserted. Holding device 50 has a round head portion 52, the diameter of which is made to form a sliding fit in front portion 46a of ring 46. The length of said head portion 52 extends preferably over the whole length of sleeve 46, and these two parts are assembled coaxially. The head of holding device 52 extends into a smaller diameter and forms a shaft 54. At the rear end of shaft 54, its diameter is reduced to form a shoulder 56, which at its end has a threaded hole, into which a cap-screw 57 can be inserted, as shown in FIG. 5. This arrangement, in conjunction with a hole 45 in the handle, creates a thrust bearing, which prevents axial movement of the holding device 50.

Inside the head portion 52 of holding device 50 is a chamber of such form, so a cutting blade 80 having a rectangular cross section, can be inserted into it at an oblique angle. In other words, between the centerline of the rectangular cutting blade and the centerline z of the holding device 50, there is an acute angle.

The blade 80 has the form of an essentially rectangular bar. At one end, a cutting head 82 is formed, and on each of its two sides, a cutting edge is ground, 82a and 82b. These cutting edges may be curved at least partially. To the cutting head 82, a shaft 84 is adjoined, which can be inserted into chamber 70 at least partially, as shown in FIG. 3. Two notches 86 are ground into the rear end of shaft 84, on opposite sides of the cutting blade 80. When the blade 80 is properly inserted into the chamber 70, a corresponding protrusion, or catch 87, built into the chamber will have snapped into said notch.

The chamber 70 has at its outer end a slightly larger profile than the shaft 84 of the cutting blade 80. However, in its interior, there is a space, which allows a spring, preferably a leaf spring 90, to be inserted into chamber 70 next to blade shaft 84. Chamber 70 may be provided with a slot, into which one end of the leaf spring can be pressed and held. The other end of this leaf spring is free to move. As shown in FIG. 3, when shaft 84 is inserted into holding device 50, spring 90 presses against it until the notch 86 snaps into the corresponding catch 87. When blade 80 is in place, preloaded spring 90 will hold it in position. Whenever the blade 80 has to be removed, the blade head 82 is pressed in the direction of centerline z, until the catch 87 releases notch 86.

As also shown in FIG. 3, the rear portion 52 of holding device 50, has a slot 75 near portion 46b of sleeve 46, which creates an opening into chamber 70. Therefore, the shank 84 of cutting blade 80 enters partially into slot 75, when inserted into the chamber 70. The depth of slot 75 is about half the diameter of a steel ball 100. The dimensions of slot 75 and of the adjacent diameter 46b of the locking ring 46 are such that the ball 100 can roll freely in slot 75 when no cutting blade is inserted.

The ball 100, in conjunction with the locking portion 46c of locking ring 46, creates a locking mechanism, by which the rotation of holding device 50 in sleeve 46 and the housing 42 can be arrested. This locking mechanism is described further with the aid of FIGS. 4–6.

Figure 4:
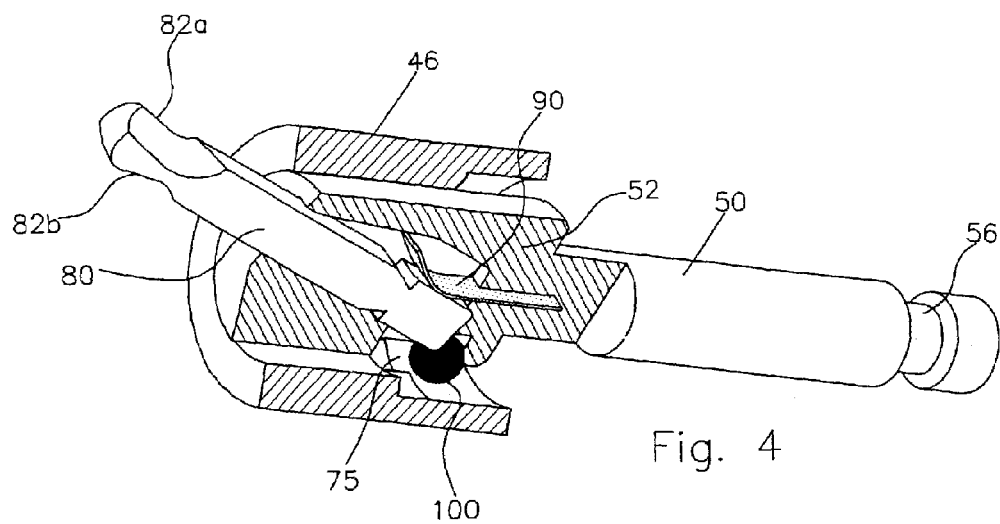
FIG. 4 illustrates the holding device with inserted cutting blade, according to FIG. 3, inserted rotatably in a sleeve.

FIG. 4 shows the deburring tool 40 without its housing 42, in which the holding device 50 can freely rotate in sleeve 46. As shown in FIG. 4, the shaft 84 of blade 80 enters into slot 75, and holds the steel ball 100 away from the locking elements 46c of sleeve 46.

In order to block the rotation of holding device 50, the head 82 of blade 80 is pressed in the direction of the axis of rotation z. If the deburring tool 40 is now held in the appropriate position, the steel ball 100 is free to roll, by its own weight, into one of the locking recesses 48 of locking ring 46 (FIG. 6). After releasing the pressure on blade 80, spring 90 will press the blade back, so notch 86 of shaft 84 will again engage the catch 87 of the holding device. The ball is now held in one of the recesses 48 of locking ring 46, as shown in FIG. 5, thereby blocking rotation of holding device 50 in sleeve 46, and housing 42.

Figure 7:
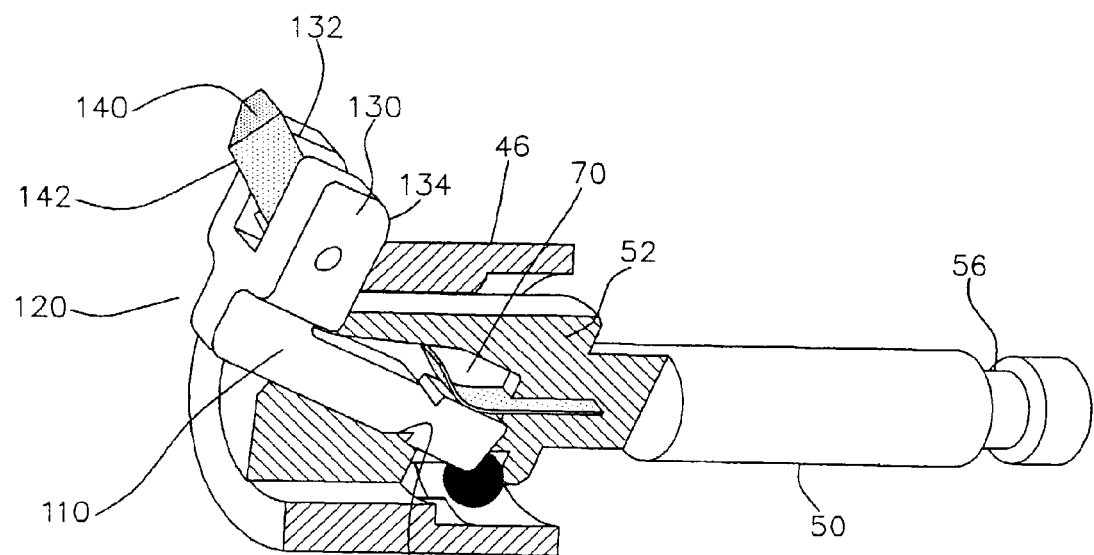
FIG. 7 illustrates the holding device, rotatable in a sleeve, according to FIG. 3, and a tool holder inserted into said holding device.

FIG. 7 shows sleeve 46 and, inside it, holding device 50 of a second embodiment of the deburring tool of the present invention. Instead of the cutting blade 80, the shaft 110 of a bladeholder 120 is now inserted into the front part 52 of holding device 50. The shaft 110 is basically identical to shaft 84 of cutting blade 80, therefore further explanations are not needed. Adjoining the outer end of shaft 110, and at an obtuse angle to said shaft 110, is a fork-like holding arm 130. Between two sides 132 and 134 of this holding arm, a cutting blade 140 or an insertable insert can be fastened. Cutting edge 142 of blade 140 may be adjusted to any angle.

Figure 8:
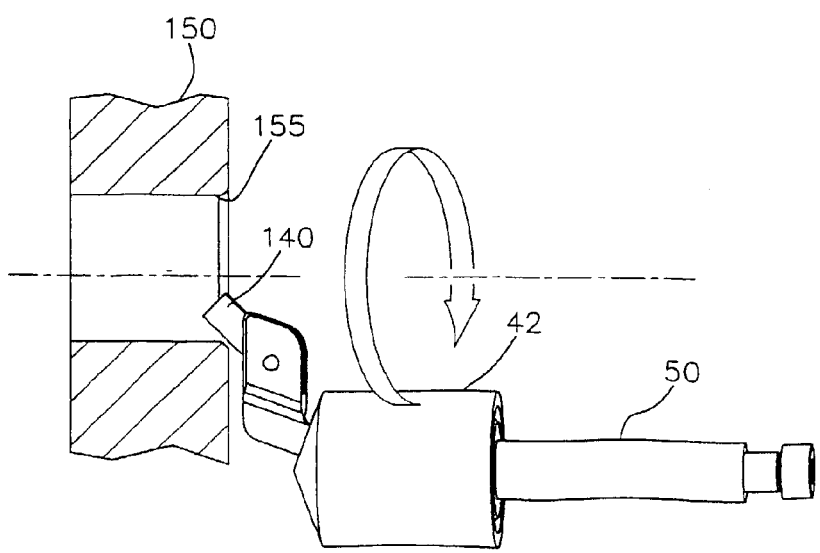
FIG. 8 illustrates the holding device according to FIG. 7, deburring a hole.

FIG. 8 shows schematically the front part of housing 42 of the deburring tool 40 with bladeholder 120, as shown in FIG. 7, gripping the adjustable cutting blade 140. To perform deburring, blade 140 with its cutting edge 142, is inserted into hole 155 of a workpiece 150, and a rotating motion, as shown by the arrow, is carried out.

I claim:
1. A hand tool for deburring comprising:
 (a) a housing designed to be hand-held;
 (b) a cutting blade comprising a cutting head, a shaft, and at least one notch positioned at a rear end of the shaft; and
 (c) a rotatable holding device comprising a chamber for releasably holding the shaft of said cutting blade, the chamber comprising a protrusion, a spring, a slot, and a ball, wherein the protrusion engages the at least one notch of the shaft, a first end of the spring is held in a slit provided in the chamber and a second end of the spring presses against the shaft and holds the cutting blade in position, and the ball moves in the slot whereby, in a locked position, the ball is held in a recess of the holding device by the cutting blade,
wherein the holding device is positioned within the housing, wherein the holding device is rotatable around a longitudinal axis of the housing and is able to freely rotate relative to the housing, and wherein the chamber runs obliquely to the axis of rotation (z) of the holding device whereby the cutting blade is held at an oblique axis within the holding device.

2. A hand tool according to claim 1, wherein the holding device cannot move in an axial direction.

3. A hand tool according to claim 2, wherein the holding device has a round shaft and a thrust bearing, and the housing has an opening and wherein axial movement between the holding device and the housing is prevented by the thrust bearing and the opening.

4. A hand tool according to claim 1, further comprising a locking device which prevents rotation of the holding device relative to the housing.

5. A hand tool according to claim 1, wherein the cutting blade is essentially straight, and has a shaft to be inserted into the chamber of the holding device, and both the shaft and the chamber have the form of an elongated polygon.

6. A hand tool according to claim 5, wherein the cutting blade has a cutting edge at each of two opposite sides, and the shaft has a locking notch at each of its respective sides.

7. A hand tool according to claim 6, wherein the cutting edges are at least partially curved.

8. A hand tool, according to claim 1, wherein the housing forms part of a handle.

* * * * *